United States Patent
Fessler-Knobel et al.

(10) Patent No.: US 11,471,966 B2
(45) Date of Patent: Oct. 18, 2022

(54) WORK STATION FOR ELECTROCHEMICALLY MACHINING A WORKPIECE, IN PARTICULAR A ROTATIONALLY SYMMETRICAL WORKPIECE, COMPRISING A PLURALITY OF RECESSES, AND METHOD FOR PRODUCING AN END CONTOUR OF A RECESS

(71) Applicant: MTU Aero Engines AG, Munich (DE)

(72) Inventors: Martin Fessler-Knobel, Munich (DE); Roland Huttner, Jesenwang (DE)

(73) Assignee: MTU Aero Engines AG, Munich (DE)

( * ) Notice: Subject to any disclaimer, the term of this patent is extended or adjusted under 35 U.S.C. 154(b) by 123 days.

(21) Appl. No.: 16/965,428

(22) PCT Filed: Jan. 25, 2019

(86) PCT No.: PCT/DE2019/000016
§ 371 (c)(1),
(2) Date: Jan. 22, 2021

(87) PCT Pub. No.: WO2019/149303
PCT Pub. Date: Aug. 8, 2019

(65) Prior Publication Data
US 2021/0138568 A1    May 13, 2021

(30) Foreign Application Priority Data
Feb. 1, 2018    (DE) .................... 10 2018 201 568.6

(51) Int. Cl.
*B23H 9/10*    (2006.01)
*B23H 3/04*    (2006.01)
(Continued)

(52) U.S. Cl.
CPC .............. *B23H 9/10* (2013.01); *B23H 3/04* (2013.01); *B23H 7/26* (2013.01); *F01D 5/30* (2013.01);
(Continued)

(58) Field of Classification Search
CPC ....................................... B23H 9/10
See application file for complete search history.

(56) References Cited

U.S. PATENT DOCUMENTS

2006/0243601 A1* 11/2006 Bayer .................. B23H 9/10
205/654
2016/0074952 A1    3/2016 Huttner et al.

FOREIGN PATENT DOCUMENTS

DE    102005039279 A1    2/2007
DE    102015102720 A1 *  8/2016
(Continued)

OTHER PUBLICATIONS

PEM Tec, High Precision Technology, Aerospace Industry, http://www.pemtec.de/anwendungen/luft-und-raumfahrt, 2017.

*Primary Examiner* — Nicholas A Smith
(74) *Attorney, Agent, or Firm* — Barlow, Josephs & Holmes, Ltd.; David R. Josephs (57) ABSTRACT

The invention relates to a work station for electrochemically machining a workpiece, having a number of recesses, including a base structure; a module which is fastened to the base structure and is configured to electrochemically machine the workpiece. A workpiece holder is fastened to the base structure. The workpiece holder is movable relative to the base structure along a feed axis which is parallel to the axis of rotation of the module. The module includes an electrode carrier arrangement, which is coupled to the module base body so the electrode carrier arrangement can be rotated together with the module base body about the axis of rotation of the module. The electrode carrier arrangement
(Continued)

has a carrier frame and an electrode frame, where at least one electrode is detachably fastened to the electrode frame.

15 Claims, 9 Drawing Sheets

(51) Int. Cl.
*B23H 7/26* (2006.01)
*F01D 5/30* (2006.01)

(52) U.S. Cl.
CPC ...... *B23H 2300/10* (2013.01); *B23H 2500/00* (2013.01); *F05D 2220/32* (2013.01); *F05D 2230/11* (2013.01)

(56) References Cited

FOREIGN PATENT DOCUMENTS

| | | | |
|---|---|---|---|
| DE | 102015102720 | A1 | 8/2016 |
| EP | 1707294 | A2 | 10/2006 |
| EP | 3015210 | A2 | 5/2016 |
| WO | 2014202862 | A1 | 12/2014 |

\* cited by examiner

WORK STATION FOR ELECTROCHEMICALLY MACHINING A WORKPIECE, IN PARTICULAR A ROTATIONALLY SYMMETRICAL WORKPIECE, COMPRISING A PLURALITY OF RECESSES, AND METHOD FOR PRODUCING AN END CONTOUR OF A RECESS

BACKGROUND OF THE INVENTION

The present invention relates to a work station for electrochemically machining a workpiece, in particular a rotationally symmetrical workpiece, having a plurality of recesses, comprising a base structure; a module which is fastened to the base structure and is configured to electrochemically machine the workpiece, wherein the module comprises a module base body that can be rotated relative to the base structure about an axis of rotation of the module (MZ); a workpiece holder fastened to the base structure, on which a workpiece can be fastened or is fastened, the workpiece holder being movable relative to the base structure along a feed axis (Z) which is parallel to the axis of rotation of the module (MZ), wherein the module comprises an electrode carrier arrangement, which can be coupled to the module base body in such a way that the electrode carrier arrangement can be rotated together with the module base body about the axis of rotation of the module.

Such a work station is known, for example, from EP 3 015 210 A2. The system disclosed there serves in particular for the purpose of machining the spaces between blades of an integrated blade disk (so-called blisk).

In addition to integrated blade disks, blade disks are also employed in gas turbines whose (rotating) blades are inserted by their blade roots into corresponding blade root recesses of the blade disk. In this application, it is necessary to manufacture the blade root uptakes with a dimensionally precise profile (inner contour) in the blade disk. Thus far, mechanical methods for removing material have been used for this, such as, for example, broaching and/or milling and/or grinding. In the case of broaching the blade root recesses, which can also be referred to as profile grooves, geometrical deviations usually occur within the profile groove. Moreover, it has been found that an intensified wear occurs on mechanically operating tools with the increasingly common use of heat-resistant materials.

SUMMARY OF THE INVENTION

The object of the invention is to provide a work station or system of the named kind for the machining of rotationally symmetrical workpieces in particular, in order to be able to avoid the above disadvantages.

In order to achieve this object, it is proposed for a work station that the electrode carrier arrangement comprises a carrier frame and an electrode frame, wherein at least one electrode is detachably fastened to the electrode frame, wherein the electrode carrier arrangement, especially the carrier frame and the electrode frame, is movable in translation relative to the module base body in a first machining direction, and wherein the electrode frame is movable relative to the carrier frame, oscillating in a second machining direction, wherein the first machining direction and the second machining direction are aligned at an angle of around 45° to around 90° with respect to each other, and are orthogonal to the axis of rotation of the module.

The terms carrier frame and electrode frame here should be understood such that the term "frame" is a carrying structure in general, without "frame" implying an enclosed and/or rod-shaped (trusslike) construction.

It has been found that, with an electrode carrier arrangement configured in this way, recesses such as, for example, blade root recesses of a blade disk of a gas turbine can be manufactured with high precision. In this case, in particular, the oscillating movement along the second machining direction serves here for producing an end (inner) contour or final contour of the recess, and with electrochemical machining it is possible to avoid deleterious geometrical deviations such as are known for mechanical methods. Usually the workpieces to be machined by the work station are rotationally symmetrical. The recesses here are situated along the periphery of the workpiece. In other words, on a machine-finished workpiece there are multiple recesses arranged neighboring or next to each other in the peripheral direction.

As a further development, it is proposed that the electrode frame is hinged to the carrier frame, in particular it is connected by at least two solid joints to the carrier frame. The solid joints may be designed, for example, as leaf springs, the deflection of the leaf springs occurring basically in the second machining direction. The solid joints may be designed in particular such that they hold the electrode frame in a position of rest in a nominal position relative to the carrier frame.

In order to make possible the oscillating movement of the electrode frame, an eccentric drive can be provided in the carrier frame, whose eccentric shaft is connected to a first end segment of a rocker element, the rocker element being connected by a second end segment to the electrode frame, and the rocker element being connected to the carrier frame in a middle segment located between the first end segment and the second end segment.

In order to make possible the most accurate oscillatory movement of the electrode frame and the electrode connected to it, it is proposed that the eccentric drive comprises a torsion motor or torque motor.

The electrode may have an outer contour of a first electrode type, corresponding substantially to a final contour of a blade root recess to be produced in the workpiece, especially a profile groove. Alternatively, the electrode may have an outer contour of a second electrode type, corresponding substantially to a preliminary contour or pre-contour of a recess to be produced in the workpiece, especially a profile groove. The electrodes of the first type and the second type are interchangeable, in particular, so that the same work station can be operated as one chooses with electrodes of differing electrode type.

An amplitude of the oscillating movement of the electrode of the first electrode type can be regulated or adjusted preferably in dependence on the electrochemical ablation of material of the workpiece such that the amplitude becomes larger with increasing material ablation. For this, it is further proposed that a spacing between the outer contour of the electrode of the first electrode type and a pre-contour of the recess already present in the workpiece prior to the start of an oscillatory electrochemical machining is less than or equal to around 0.4 mm. In particular, the work station is adapted to performing the oscillatory movement of the electrode of the first electrode type during the electrochemical machining until such time as the recess has the desired final contour. After completion of the electrochemical machining by the oscillating electrode of the first electrode type, the inner contour of the recess has a spacing relative to the outer contour of the electrode of the first type of around 0.2 to 0.5 mm, preferably around 0.3-0.4 mm. In particular, a precise or pulsed electrochemical machining (PECM) method can also be used as the electrochemical machining method in the case of the electrode of the first electrode type. In this case, a voltage is applied to the electrode as a function of the oscillatory movement. In particular, the voltage is applied when the electrode has attained the maximum or minimum value of the amplitude, respectively, and is thus located at the reversal point where it is closest to one side of the (preliminary) contour of the recess being machined. In this way, the (electrochemical) ablation of material of the workpiece, especially material of the pre-contour, occurs evenly on the side of the recess (profile groove) having the smaller gap relative to the electrode. The enlarging of the recess until it attains the final contour is conducted by increasing the swing angle on the part of the drive unit (torsion motor), whereby the amplitude of the oscillatory movement of the electrode can be increased.

The electrode of the first electrode type can be introduced along the first machining direction into a pre-contour of a recess already present in the workpiece, the electrode having a probing tip in a forward region relative to the direction of introduction. For this, it is proposed, in addition, that the work station is adapted to determine, by the probing tip, the relative position of the electrode of the first electrode type to a pre-contour of the recess already present in the workpiece before the introduction of the electrode and to adapt it as needed, so that the electrode can be introduced with its outer contour substantially centered relative to the pre-contour.

The electrode of the second type, which can be used alternatively in particular, can be adapted to produce a pre-contour of a recess, especially a blade root recess or profile groove, in a still solid segment of the workpiece by electrochemical machining, the electrode of the second type being moved, especially driven, along the first machining direction relative to the workpiece. An electrochemical ablation of material of the workpiece, especially the blade disk, occurs in this case especially at a front end of the electrode of the second electrode type. The machining of the recess by the electrode of the second electrode type can be used alternatively to a mechanical broaching method in order to produce the pre-contour of the recess. Moreover, a pre-contour produced by a mechanical machining process can be electrochemically machined by the electrode of the second electrode type, in order to obtain the final contour true to size.

Moreover, the invention relates to a system for the electrochemical machining of a workpiece, especially a rotationally symmetrical workpiece having a plurality of recesses, comprising at least one first work station having an electrode of the second electrode type for producing a pre-contour of recesses and at least one second work station having an electrode of the first electrode type for producing the final contour of recesses, wherein the system is preferably configured to transport a workpiece from the first work station to the second work station, especially by a coordinated transport mechanism.

Moreover, the invention also relates to a method for producing a final contour of a recess in a workpiece, especially a rotationally symmetrical workpiece, in particular, a blade root recess in a blade disk of a gas turbine, especially an aircraft gas turbine, involving the steps:
a) providing a workpiece, especially a blade disk, having at least one recess fashioned at its peripheral edge, comprising a pre-contour provided with an oversize measurement;
b) orienting an electrode as a function of measured values detected at the pre-contour,
c) introducing the electrode into the pre-contoured recess along a first machining direction, corresponding substantially to a longitudinal direction of the recess, the longitudinal direction running in parallel with or inclined to its axial direction relative to the workpiece;
d) moving the electrode in oscillating manner in the recess along a second machining direction, oriented at an angle of around 45° to 90° to the first machining direction, the second machining direction running substantially parallel to the peripheral direction of the workpiece or the blade disk relative to the workpiece, especially the blade disk, wherein during the oscillatory movement crosswise to the longitudinal direction of the recess, material is alternately removed from that side of the pre-contour which is situated closer to the oscillating electrode, until the final contour of the recess has been produced, removing the electrode along the first machining direction from the recess with the final contour so produced.

This method can be carried out, in particular, by a work station as described above. The workpiece provided in step a), especially the blade disk so provided, generally already has all recesses required for the later use with the respective pre-contour, the recesses being provided along the entire peripheral edge of the workpiece, especially the blade disk. A so-called disk hump is formed each time between two blade root recesses in such a blade disk.

In the method, steps b) to e) can be repeated for each recess with its pre-contour that is present along the periphery of the workpiece, especially the blade disk. Moreover, each time after step e) of the method, the workpiece, especially the blade disk, can be rotated relative to the electrode until another recess with a pre-contour, especially an adjacent recess, is situated in a suitable position for performing steps b) to e). Accordingly, the workpiece, especially the blade disk, can be clamped once in a corresponding work station, and after each electrochemical machining of a recess, especially a blade root recess, (from the pre-contour to the final contour) the workpiece, especially the blade disk is turned somewhat about its axis until the next recess to be machined, especially a blade root recess, is positioned with its pre-contour such that the electrode of the work station can be introduced into the pre-contoured recess, especially the blade root recess, for the purpose of an oscillating electrochemical machining of the pre-contour to the final contour.

Finally, step a) of the method may particularly involve the producing of the recesses, especially the blade root recesses, with their respective pre-contour by an electrochemical machining of solid peripheral segments of the workpiece, especially the blade disk, wherein the electrochemical machining is carried out with another electrode and wherein the other electrode is moved along a machining direction or the first machining direction corresponding substantially to a longitudinal direction of the recess being produced, especially the blade root recess, the longitudinal direction running in parallel with or inclined to the axial direction relative to the workpiece, especially the blade disk.

BRIEF DESCRIPTION OF THE DRAWING FIGURES

In the following, the invention shall be described by way of an example, but it is not limited to this example, making reference to the appended figures.

DESCRIPTION OF THE INVENTION

Figure 1:
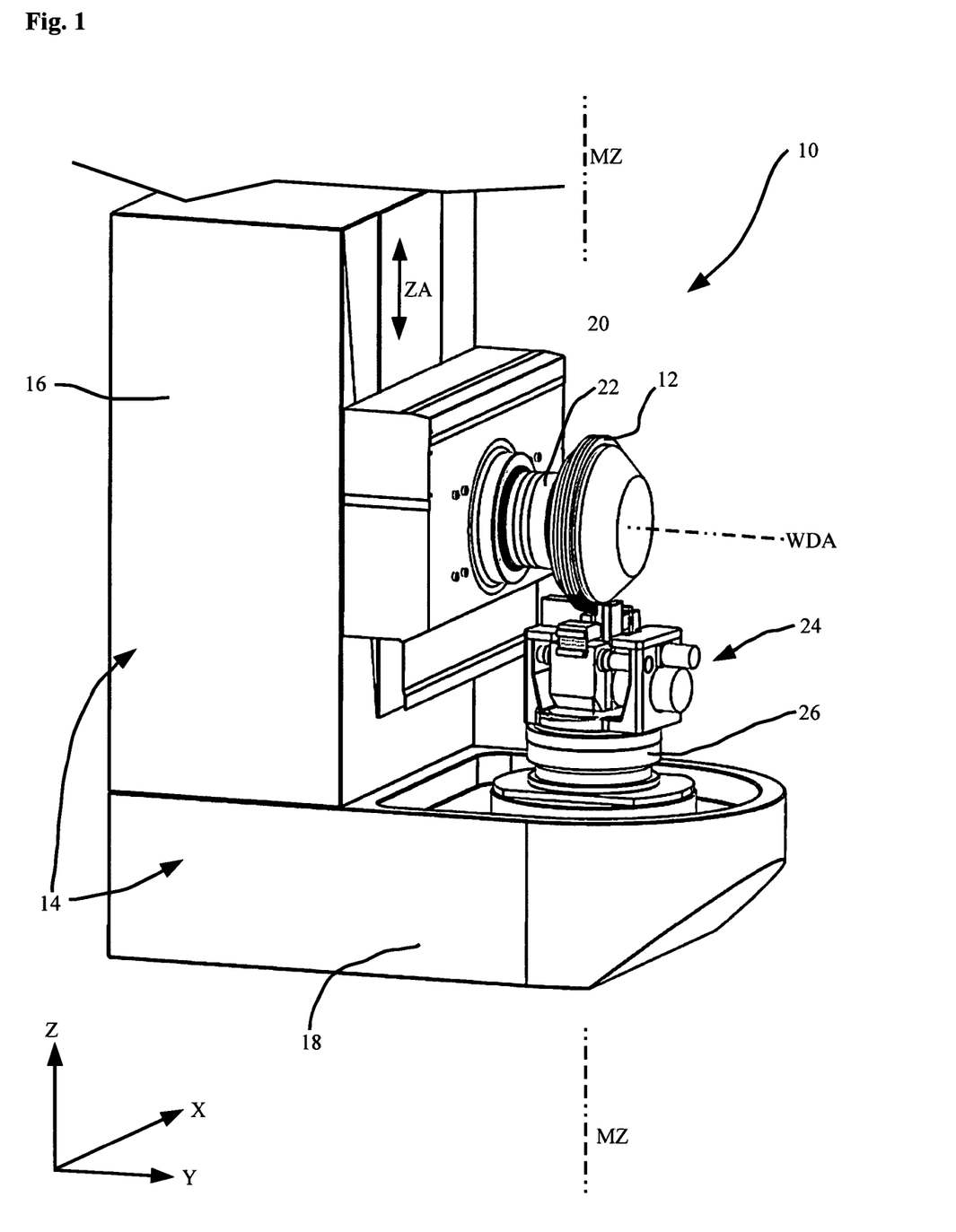
FIG. 1 shows, in a schematic and simplified perspective view, one embodiment of a work station for electrochemical machining of a workpiece.
Figure 2:
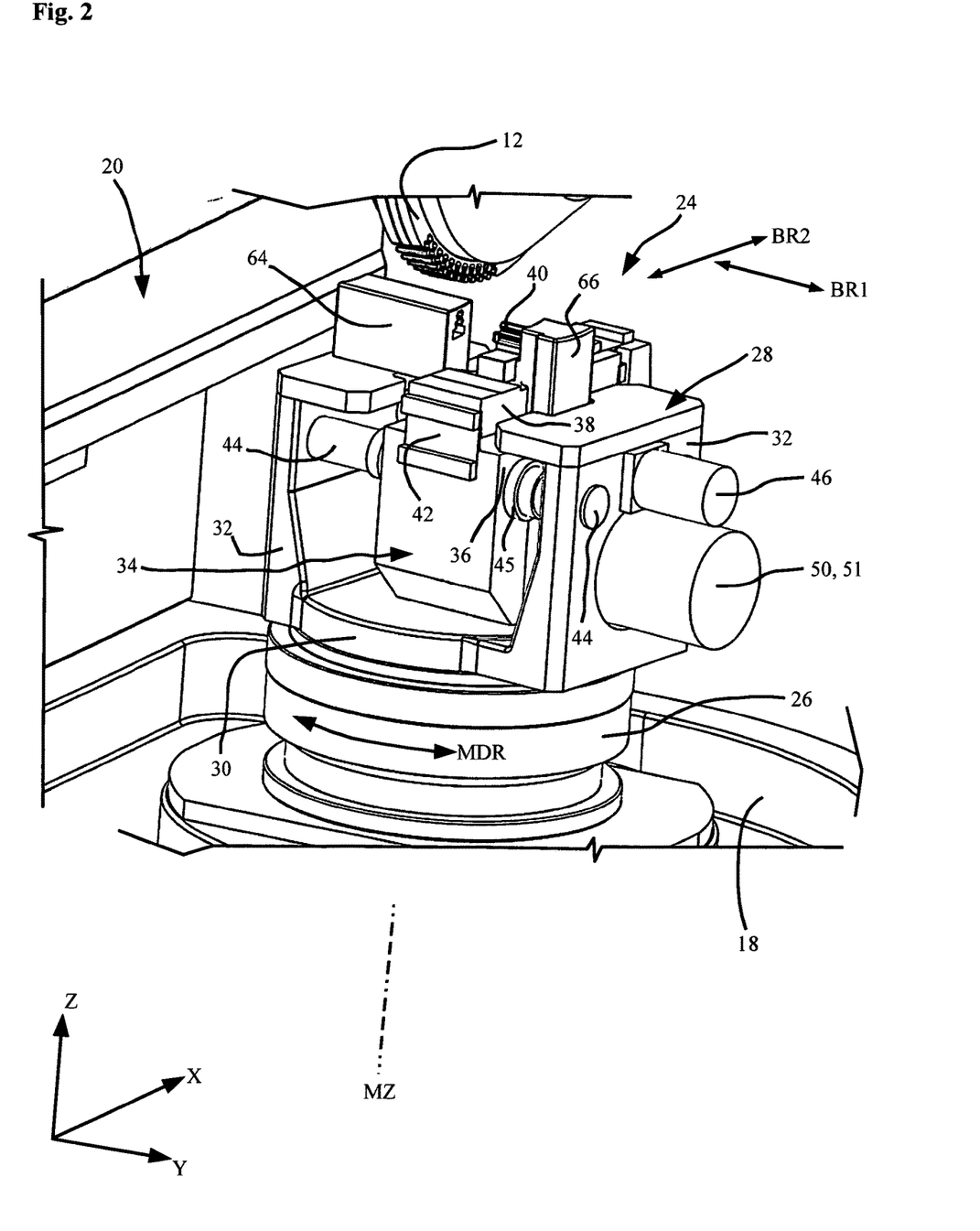
FIG. 2 shows an enlarged excerpt of the perspective view of the work station of FIG. 1.
Figure 3:
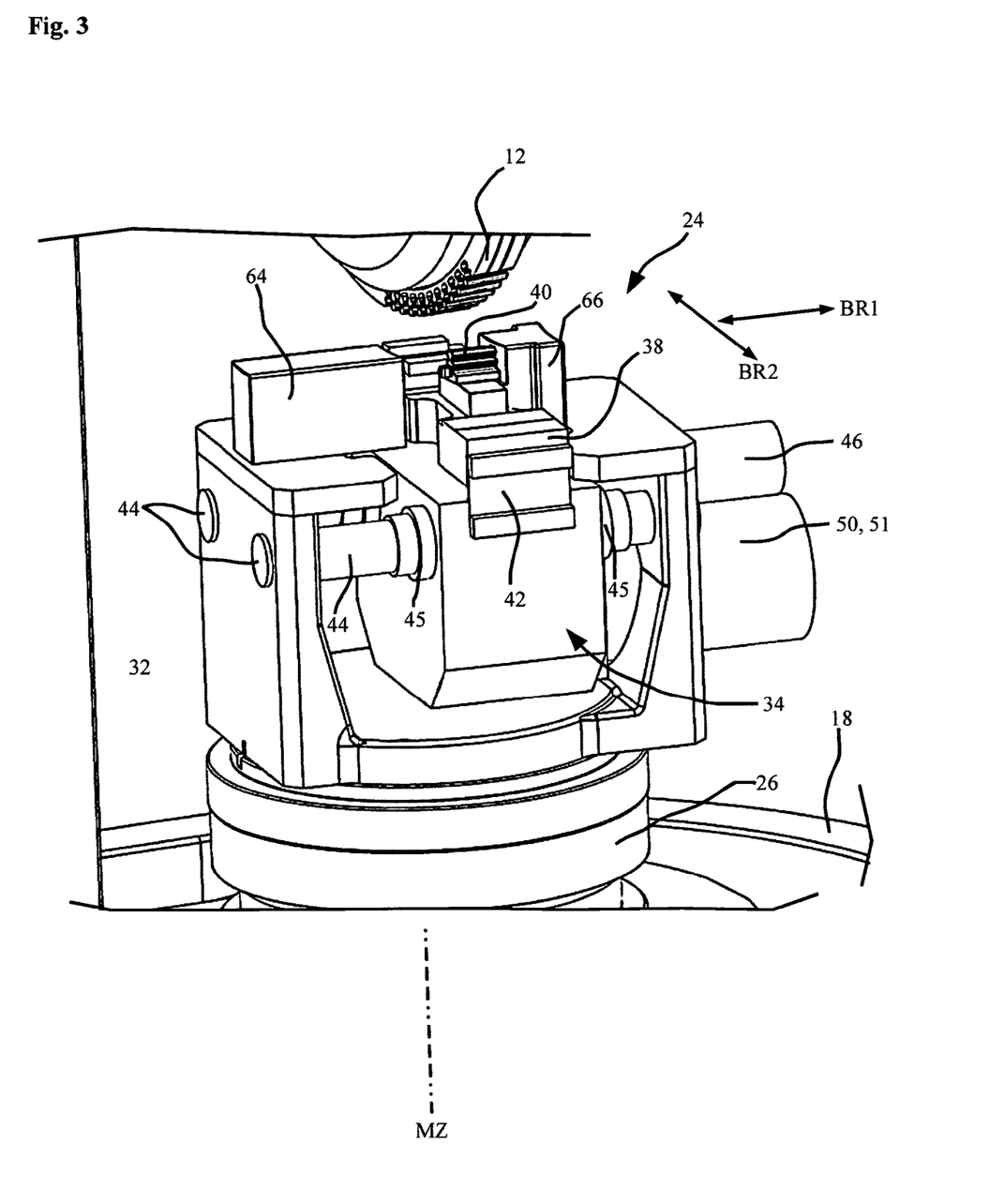
FIG. 3 shows a perspective view similar to FIG. 2 from a somewhat different viewing angle.
Figure 4:
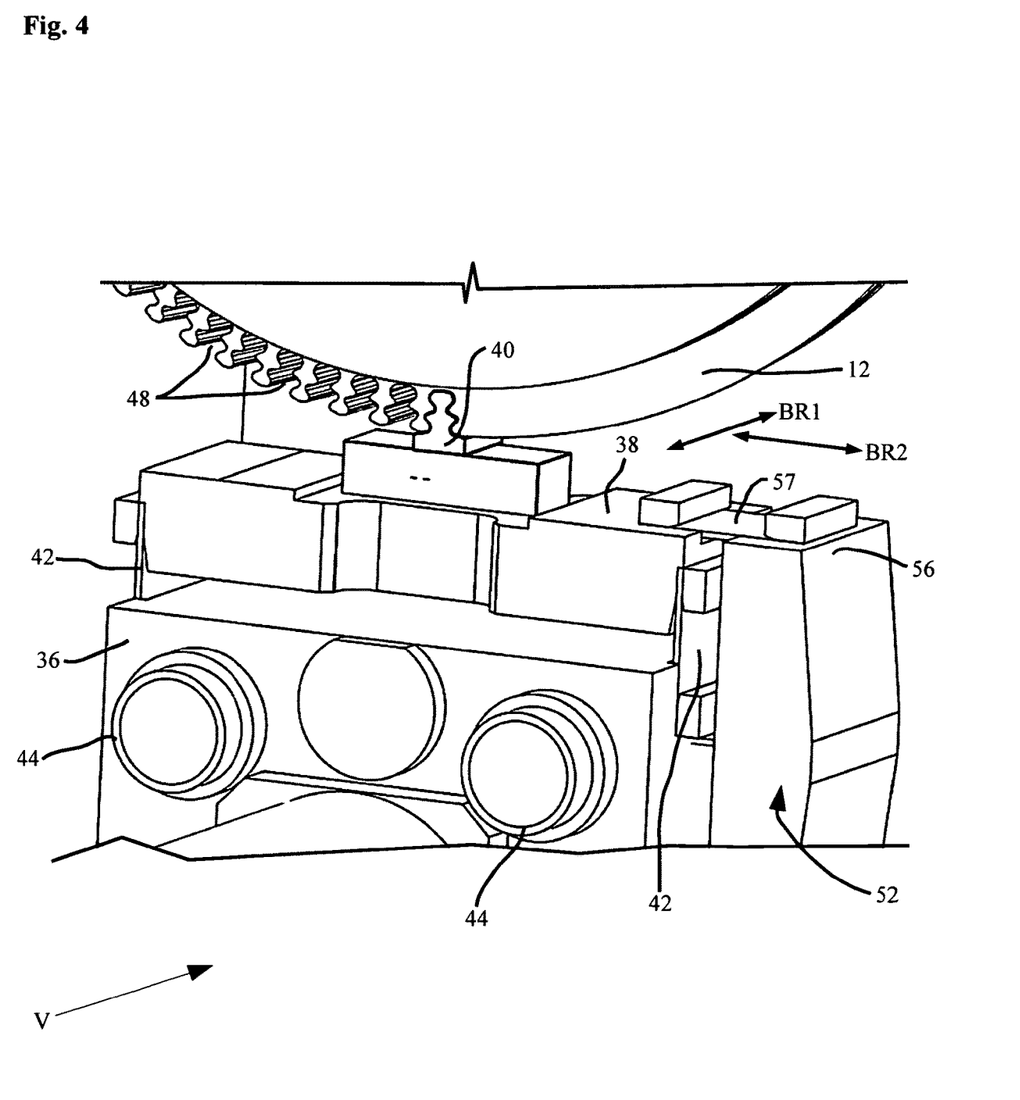
FIG. 4 shows another enlarged perspective representation of the work station of FIG. 1.

FIG. 1 shows, in a schematic and simplified perspective view, a work station 10 for electrochemical machining of a workpiece 12. The workpiece 12 is, in particular, a blade disk of a gas turbine. The work station 10 comprises a base structure 14. The base structure 14 comprises a vertical carrier 16 and a horizontal carrier 18, which are joined together. On the vertical carrier 16 there is provided a workpiece holder 20, on which the workpiece 12 (blade disk) is or can be fastened.

The workpiece holder 20 is movable along the vertical carrier 16, so that the workpiece holder can be moved toward or away from the horizontal carrier 18. The movement direction of the workpiece holder 20 is substantially parallel to the Z-direction and can be called the feed axis or feeding direction ZA. The workpiece 12 (blade disk) is rotatably fastened to the workpiece holder 20. In particular, the workpiece holder 20 comprises an axial carrier 22, on which the workpiece 12 can be fastened, in particular, the blade disk is or can be mounted on the axial carrier 22 by a hub segment, not visible here. The axial carrier 22 is likewise movable along the feed axis or direction ZA and it can turn about an axis of rotation of the workpiece WDA. In the base structure 14, especially in the vertical carrier 16 and/or in the workpiece carrier 22 there are accommodated driving devices, not visible here, in order to make possible the movement of the workpiece holder 20 along the vertical carrier 16 and to make possible the rotational movement of the axial carrier 22.

On the base structure 14, especially on the horizontal carrier 18, there is arranged a module 24 which is designed to electrochemically machine the workpiece 12. The module 24 is rotatably mounted relative to the base structure 14. In particular, the module 24 is mounted on a pedestal 26, which can turn about an axis of rotation MZ of the module. The pedestal 26 is connected to a driving device provided in the horizontal carrier 18 and not visible here, which makes possible the rotational movement of the pedestal 26 or of the entire module 24 about the axis of rotation MZ of the module.

The construction of the module 24 shall be explained below, referring comprehensively to the enlarged views of FIGS. 2 to 5, wherein the reference numbers used are present everywhere in the figures where a corresponding component can be seen, even if it is not always referred explicitly to the individual FIGS. 2 to 5.

The module 24 comprises a module base body 28. The module base body 28 is formed in particular by a module base segment 30 and two side carriers 32 joined to the module base segment 30. The module base body 28, especially its module base segment 30, is joined to the pedestal 26, so that the entire module base body 28 can turn about the axis of rotation MZ of the module, the direction of turning being indicated in FIG. 2 by the arrow MDR.

The module 24 furthermore comprises an electrode carrier arrangement 34, which is mounted on the module base body 28. The electrode carrier arrangement 34 can turn together with the module base body 28 about the axis of rotation MZ of the module. The electrode carrier arrangement 34 comprises a carrier frame 36 and an electrode frame 38. On the electrode frame 38 there is secured an electrode 40, especially secured in detachable manner. The electrode 40 is an electrode of a first type, as shall be further described below. The electrode frame 38 is braced on the carrier frame 36, in particular by two solid joints 42, which is best seen from the view of FIG. 4. The electrode carrier arrangement 34 or the carrier frame 36 and the electrode frame are together situated movably in translation relative to the module base body. The translation occurs here along a first machining direction BR1. The first machining direction BR1 can be substantially parallel to the principal direction Y (FIG. 1) or it can be inclined by a particular angle to the principal direction Y. The inclination of the first machining direction BR1 is produced in this case by turning the module base body 28 about the axis of rotation MZ of the module, which runs substantially parallel to the principal direction Z (FIG. 1).

The carrier frame 36 is thus movable along the first machining direction BR1 relative to the module base body 28, especially between the two side carriers 32. For this, the carrier frame 36 is movably braced against two sliding supports 44. The sliding supports 44 extend between the two side carriers 32 and are braced against them. In the example, the sliding supports 44 are designed as rods or tubes, extending through corresponding plain bearings 45 of the carrier frame 36. Alternatively, a roller bearing can also be provided for the sliding support 44 (rods or tubes). The movement of the carrier frame 36 and hence also the movement of the electrode frame 38 along the first machining direction BR1 (along the two sliding supports 44) occurs by a driving device 46. In particular, the driving device 46 is an electric motor, whose direction of turning is converted into the translatory movement of the carrier frame 36 by a gearing not shown in detail here, such as a spindle, or the like. The carrier frame 36 and hence the electrode frame 38 plus the electrode 40 can be moved along the first machining direction BR1 toward the workpiece 12 (blade disk) and away from it.

The driving device 46 can be actuated by a control mechanism belonging to the work station 10, not shown further here. Such a control mechanism may also be designed to actuate all additional drive units belonging to the work station 10, such as the drive units for the vertical movement of the workpiece holder 20 or for the turning of the module 24 about the axis of rotation MZ of the module.

As already mentioned, the electrode frame 38 is connected by solid joints 42 to the carrier frame 36. The solid joints 42 are designed, for example, as resilient deflectable metal elements, which can also be called leaf springs. The deflecting of the solid joints 42 occurs in such a way that the electrode frame 38 is movable relative to the carrier frame in a second machining direction BR2. The solid joints 42 are designed so as to hold the electrode frame 38 in a predetermined relative position (position of rest) to the carrier frame 36. With respect to the second machining direction BR2, the electrode frame 36 and the carrier frame 36 are basically centered relative to each other in the position of rest.

Figure 5:
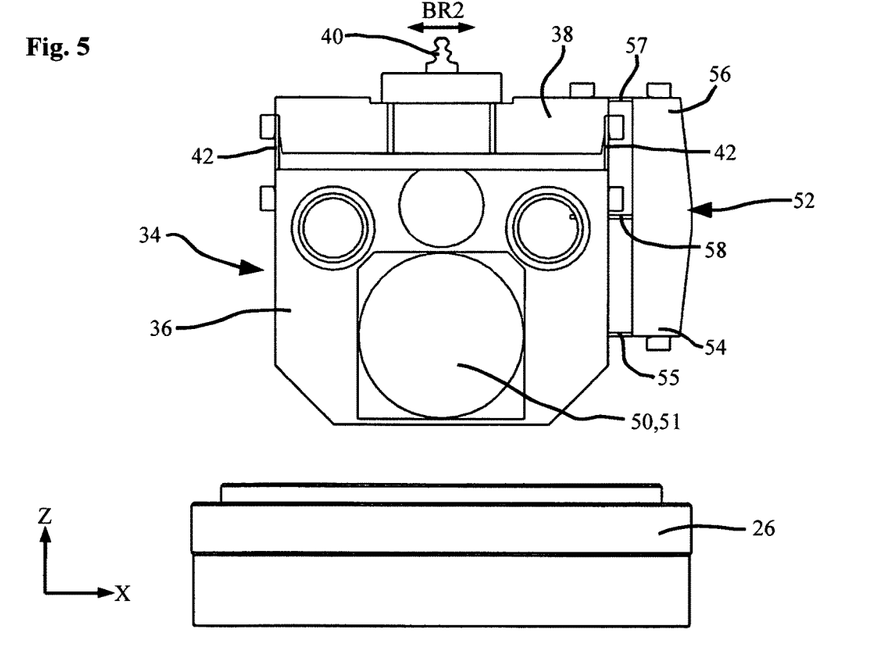
FIG. 5 shows a front view of an electrode carrier arrangement somewhat corresponding to the viewing direction V indicated by an arrow in FIG. 4.

FIG. 5 shows a front view of the electrode carrier arrangement 34 without the module base body 28. The viewing direction is roughly indicated by the arrow V in FIG. 4, corresponding substantially to the principal direction Y (FIG. 1). For a better understanding, the pedestal 26 of the module 24 is also represented in simplified fashion. The electrode frame 38 and the electrode 40 mounted thereon can move in oscillating manner by an eccentric drive 50 (see also FIGS. 3, 4) along the second machining direction BR2. The eccentric drive 50 comprises in particular, a torsion motor 51, which is coupled to an eccentric shaft, not visible. The rotational movement of the eccentric drive 50 is transferred to the electrode frame 38 by a rocker element 52 (see FIG. 5). For this, the rocker element 52 is connected at a first end segment 54 to the eccentric drive 50 and at a second end segment 56 to the electrode frame 38. The connection between the first end segment 54 and the eccentric drive 50 can be realized by a solid joint 55. The connection between the second end segment 56 and the electrode frame 38 can be realized by another solid joint 57. The rocker element 52 is braced somewhat centered between the two end segments 54, 56 in the vertical direction (parallel to the principal direction Z or the axis of rotation MZ of the module) by a rocker bearing 58 against the carrier frame 36. The eccentric drive 50, especially the torsion motor 51, can be actuated by a control mechanism (not represented) or by the control mechanism already mentioned so that the electrode 40 can be moved back and forth along the second machining direction BR2, especially by around 0.05 mm to 0.5 mm on both sides, starting from a position of rest of the electrode 40. In other words, the eccentric drive 50 with the rocker element 52 is designed so that the oscillating movement acting on the electrode 40 in the second machining direction has an adjustable, especially a regulatable amplitude of a few tenths of a millimeter, especially 0.05 mm to 0.5 mm. The amplitude of the oscillating movement of the electrode 40 can be regulated so that it is smaller in the beginning and becomes larger with increasing ablation of material from the workpiece 12, especially in the recess or blade root recess 48.

For sake of completeness, it should also be pointed out that two so-called rinsing chambers 64 and 66 are represented in FIGS. 1 to 3 and 5. The first rinsing chamber 64 is joined firmly to the carrier frame 36. The second rinsing chamber 66 can move in translation together with the electrode 40 along the first machining direction BR1 up to the workpiece 12 and away from it. The rinsing chambers 64, 66 serve in particular for supplying the electrolyte needed for the machining during the electrochemical machining of the workpiece 12 and can carry away the ablated material contained therein.

Figure 6:
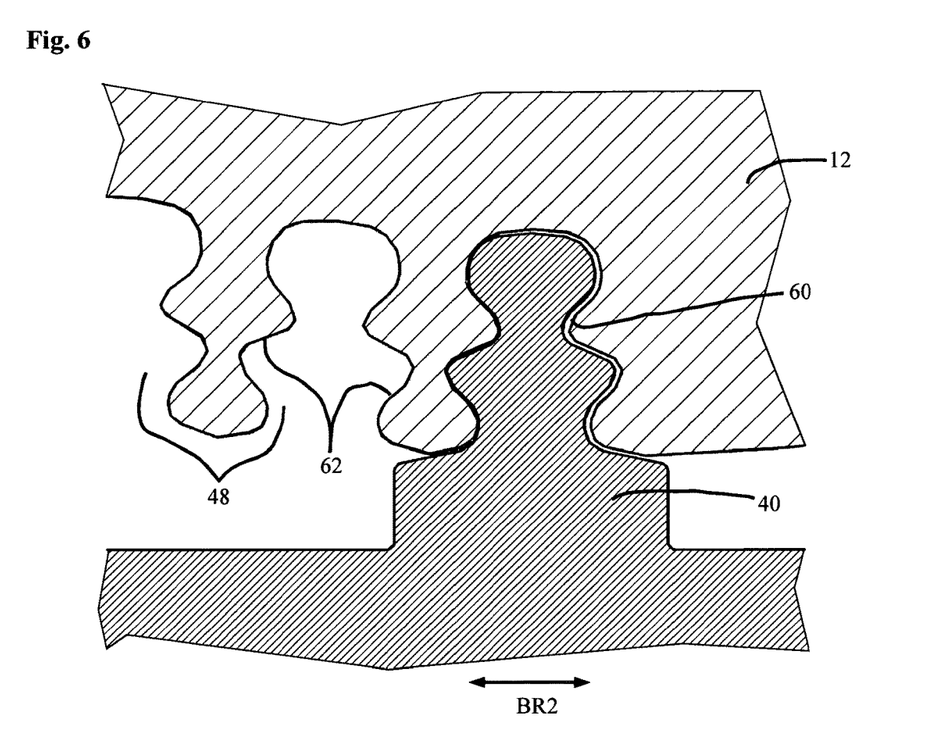
FIG. 6 shows a simplified schematic cross-sectional representation of an electrode of the work station and the workpiece being electrochemically machined.

FIG. 6 shows in a schematic, simplified cross-sectional representation the workpiece 12 or the blade disk 12 with recesses or blade root recesses 48. By the electrode 40, for a blade root recess 48 already having a pre-contour 60 with an oversize measurement, the final contour 62, thus the finished inner contour of the blade root recess 48, is produced by electrochemical machining. In this process, the electrode 40 is moved in oscillation along the second machining direction BR2.

Figure 7:
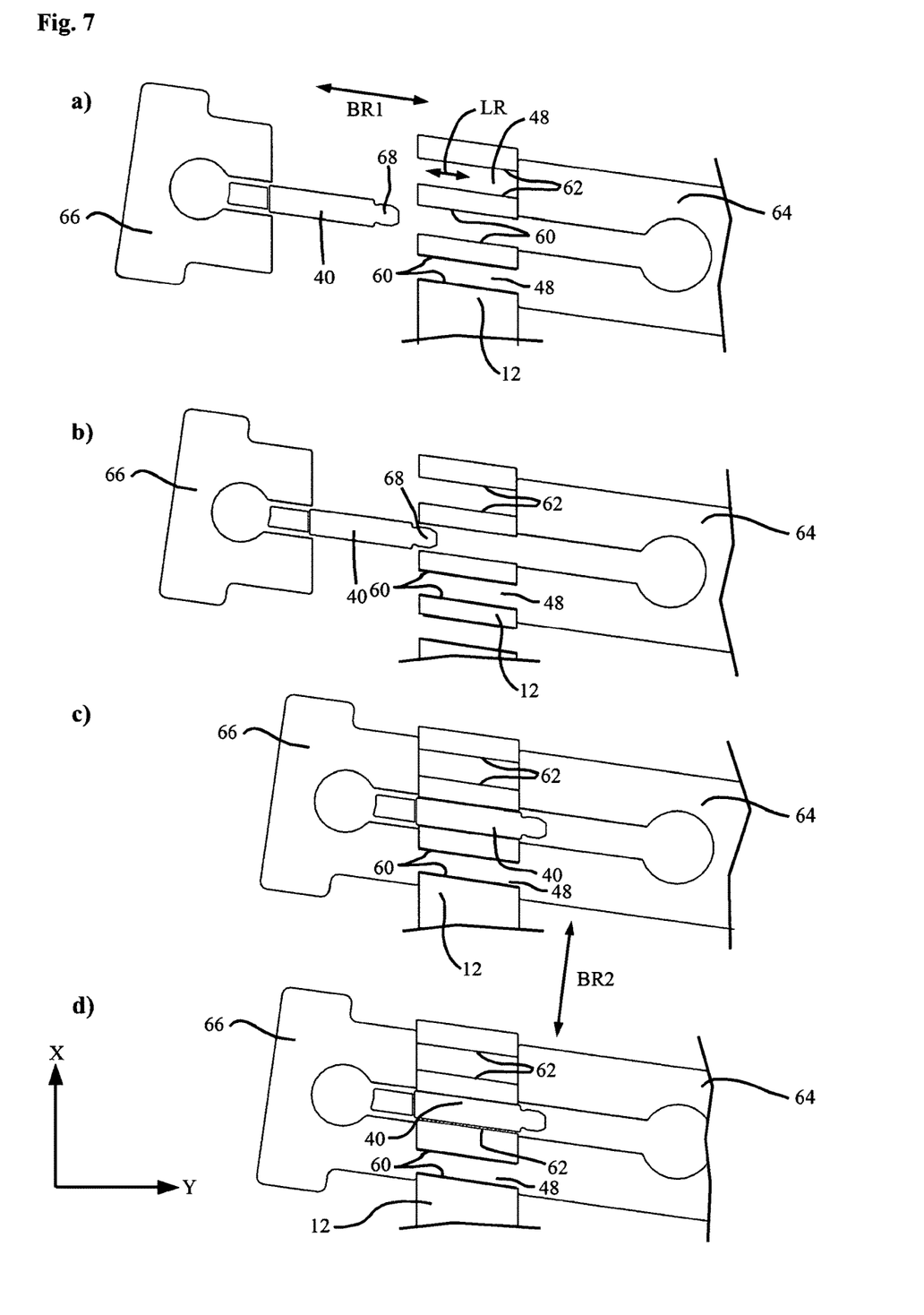
FIG. 7 shows, in figure parts a) to d), the mode of functioning (steps of the method) of the work station with an electrode of a first type for the oscillatory movement of the electrode in a recess of the workpiece.

FIG. 7 shows in the figure parts a) to d) the steps of the method in producing a final contour of a blade root recess 48 of a blade disk 12. First of all, in the case of such a machining method, a blade disk 12 is provided on a work station 10. In particular, the blade disk 12 is fastened onto the axial carrier 22 of the workpiece holder 20. At this moment in time, the blade disk 12 already has pre-contoured blade root recesses 48, with an inner pre-contour 60, as already mentioned in regard to FIG. 6. Usually, the blade root recesses 48 have a longitudinal direction LR running from an axially forward edge to the axially rear edge of the blade disk 12, being slightly inclined relative to an axial direction (corresponding to the principal direction Y or the axis of rotation of the workpiece WDA in FIG. 1) of the blade disk.

Accordingly, the module 24 with the module base body 28 is turned about the axis of rotation MZ of the module until the first machining direction BR1 is aligned with the longitudinal direction LR of the blade root recesses 48. This state is shown simplified and as an example in FIG. 7a). The electrode 40 is then moved along the first machining direction BR1 toward the workpiece 12. A probing tip 68 may be provided on the electrode 40, which, in the example of FIG. 7, is an electrode 40 of a first type. According to the method of machining, the electrode 40 is aligned relative to the blade root recess 48 with its pre-contour 60. By the probing tip 68, measured values with respect to the existing pre-contour 60 can be recorded, so that the electrode 40 can be positioned appropriately. This is shown as an example in FIG. 7b).

If the electrode 40 has been properly aligned relative to the blade root recess, the electrode 40 will be introduced along the first machining direction BR1 into the pre-contoured blade root recess 48. Once the electrode 40 has been fully introduced into the pre-contoured blade root recess 48, which is represented for example in FIG. 7c), the electrode 40 can be moved back and forth, oscillating along the second machining direction BR2, so that material is electrochemically removed along the pre-contour 60 of the blade root recess 48 until the final contour 62 of the blade root recess 48 has been produced. This is represented for example in FIG. 7d).

It is pointed out that the rinsing chambers 64, 66 are applied against the workpiece 12 during the electrochemical machining of the blade root recess 48, so that a substantially closed zone is formed in which electrolyte is present. As already mentioned, the electrode 40 of the first type is movable in translation together with the second rinsing chamber 66 along the first machining direction BR1. The oscillatory movement along the second machining direction BR2 occurs solely by the electrode 40 alone, with the second rinsing chamber 66 not moving.

The electrochemical machining of a pre-contour 60 of a blade root recess 48, such as was explained in reference to FIG. 7, is carried out preferably by pulsed or precision electrochemical machining (PECM). In this case, a voltage is always present in the electrode 40 when it is situated near or in the upper or lower reversal point of the amplitude of the oscillatory movement. In other words, a voltage is always imposed when the electrode has approached one side of the blade root recess. Accordingly, the pre-contour will be electrochemically machined or ablated on the side which is closer to the electrode 40 when the latter has been placed under voltage. Since, in such a condition, a somewhat greater spacing is present between the other side of the blade root recess 48 and the electrode 40, this gap can be rinsed with electrolyte. Thus, depending on the oscillatory movement of the electrode 40, a voltage will also be applied alternately to the electrode, so that the inner contour of the blade root recess can be electrochemically machined in alternating fashion.

The amplitude of the oscillatory movement of the electrode 40 can be increased as a function of the material removal which has been accomplished. Thus, for example, if a removal of material on both sides of 0.05 mm has been accomplished by the electrochemical machining of the blade root recess 48, the amplitude of the oscillatory movement of the electrode 40 can be increased accordingly by around 0.05 mm. When producing a final contour of a blade root recess it is assumed that the pre-contour has an oversize measurement of around 0.2 to 0.4 mm as compared to the final contour, i.e., a material ablation of around 0.2 to 0.4 mm must occur in order to obtain the final contour of the blade root recess. The electrode 40 of the first type is therefore dimensioned such that it can be introduced into the pre-contoured blade root recess 48 with a spacing of around 0.05 to 0.1 mm on both sides or on all sides. After the electrochemical machining by PECM, the spacing between electrode 40 and the final contour of the blade root recess is around 0.25 to 0.4 mm on both sides or on all sides.

It is pointed out that there are no mechanical effects occurring due to the electrochemical production of the final contour of a blade root recess such as would result in unwanted geometrical deviations for the final contour. The oscillatory movement and thus also the electrochemical machining takes place substantially in the peripheral direction of the blade disk 12 or slightly inclined to the peripheral direction. Moreover, the machining of the final contour does not involve removing chips, that is, by a blade acting locally along a cutting line, but rather it is two-dimensional thanks to the electrochemical dissolving of material of the blade disk in the electrolyte. Naturally, the outer contour of the electrode 40 is configured so that it has a basically complementary shape to the final contour of the blade root recess being produced.

The producing of pre-contoured blade root recesses 48 in a blade disk 12 can be carried out by known mechanical machining methods, such as broaching methods. Such a previously prepared blade disk 12 can then be further machined electrochemically by a work station 10 in order to produce the final contour of the blade root recesses 48.

Figure 8:
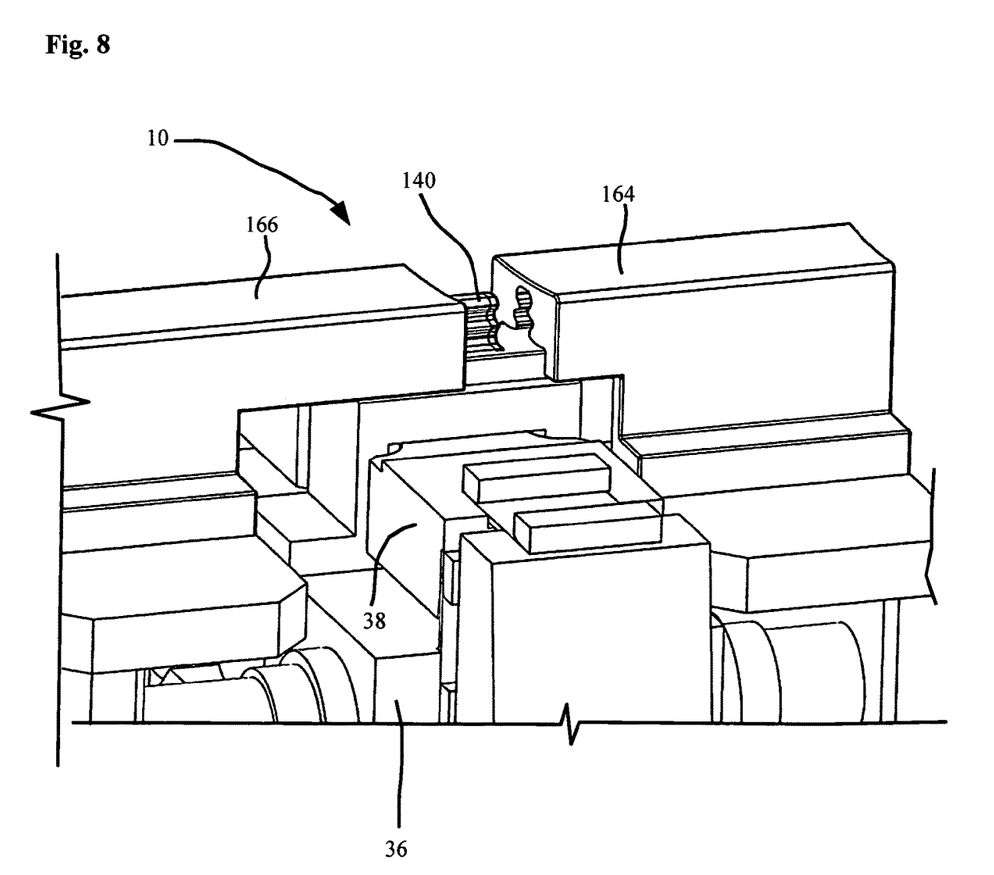
FIG. 8 shows a perspective representation of the work station of FIG. 1 with a configuration comprising an electrode of a second type.

Alternatively to a mechanical production of pre-contoured blade root recesses, the blade root recesses can also be produced by electrochemical machining. This can be carried out, in particular, by a work station 10 using an electrode 140 of a second type, as is shown in FIG. 8. The electrode 140 of the second type can be mounted instead of the electrode 40 of the first type on the electrode frame 38 or the carrier frame 36. Moreover, it can be seen from FIG. 8 that another two rinsing chambers 164, 166 will be used. Accordingly, the rinsing chambers at the work station 10 can also be designed to be interchangeable.

A pre-contoured blade root recess 48 with its pre-contour 60 is produced in a blade disk 12 by a work station 10 basically as follows. On the workpiece holder 20, especially the axial carrier 22, there is fastened a blade disk 12, there being as yet no blade root recesses present in this blade disk 12. In other words, the blade disk 12 is still solid in form along its peripheral edge. After the blade disk 12 has been provided on the work station 10, the module 24 can be turned about its axis of rotation MZ of the module so that the first machining direction BR1, along which the electrode 140 of the second type is also movable in translation, is aligned such that it coincides with a desired alignment for a longitudinal direction of the blade root recesses 48 being produced.

Figure 9:
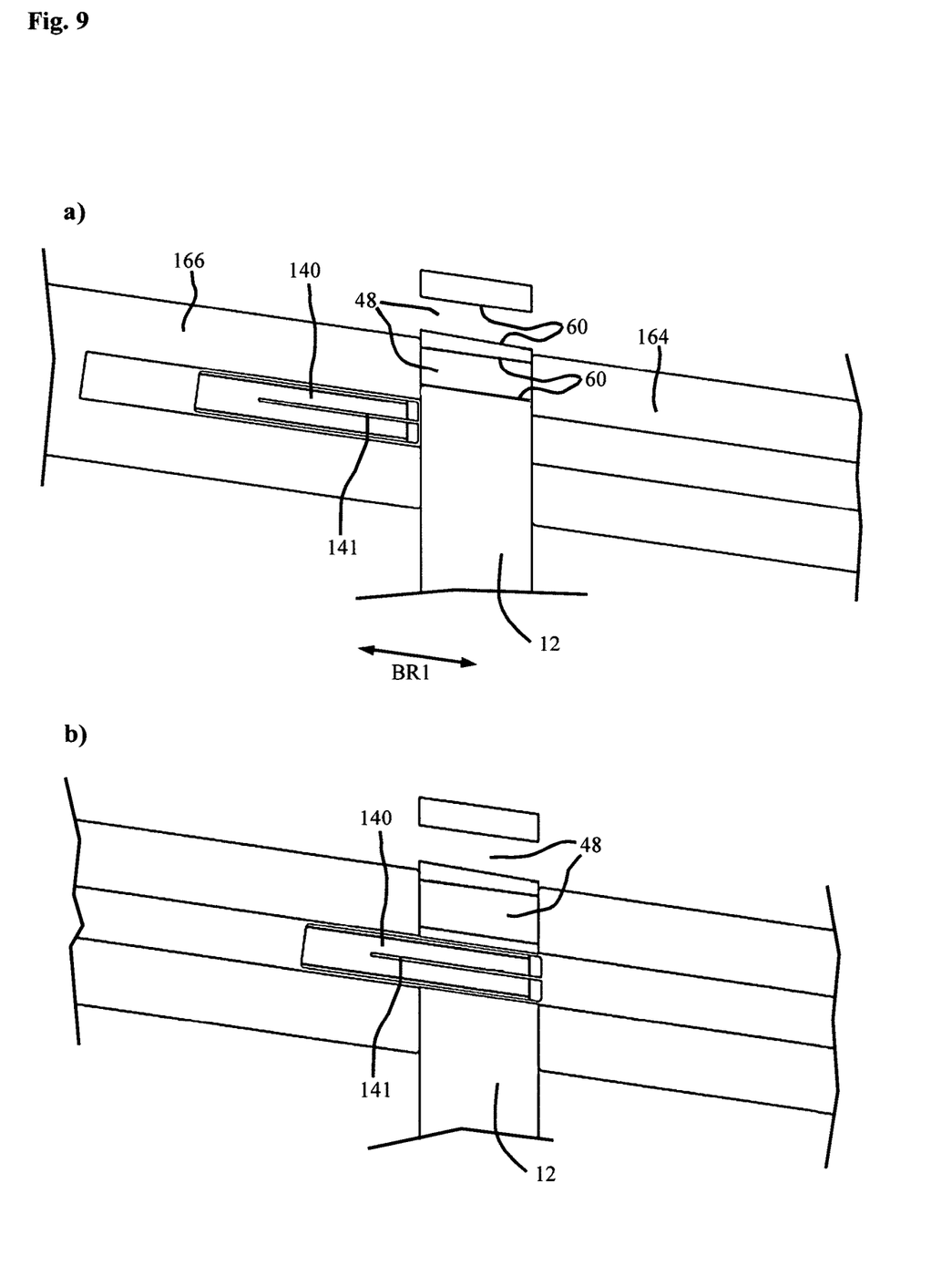
FIG. 9 shows, in figure parts a) and b), the mode of functioning (steps of the method) of the work station of FIG. 8 with the electrode of the second type.

Once the module 24 has been properly aligned, the blade disk 12 is moved downward by the tool holder along the feed axis ZA until it is situated in a desired relative position to the module 24. Such a condition is shown, for example, in FIG. 9a). In this condition, the two stationary rinsing chambers 164, 166 lie against the blade disk 12 on both sides. The electrode 140 of the second type is taken up in the second rinsing chamber 166. The electrode 140 of the second type has an open electrolyte feed 141 at its end (facing toward the workpiece).

For the electrochemical production of a pre-contoured blade root recess 48, a voltage is applied and electrolyte is supplied in the electrode 140, especially in an end segment thereof. The electrode 140 is then moved along the first machining direction BR1 toward the workpiece 12. Thanks to the electrochemical reactions and the movement of the electrode 140, the electrode 140 is driven as it were into the blade disk 12, while dissolved material of the blade disk can flow along the electrode 140 into the second rinsing chamber. This electrochemical driving is continued until such time as the electrode 140 has passed entirely through the blade disk 12 and the pre-contoured blade root recess 48 has been produced. This is shown for example in FIG. 9b). After this, the electrode 140 is moved along the first machining direction BR1 back into the second rinsing chamber 166. The blade disk is turned somewhat by the tool holder about the axis of rotation of the workpiece WDA (FIG. 1), so that the next pre-contoured blade root recess can be produced, in the same way as just described.

Figure 10:
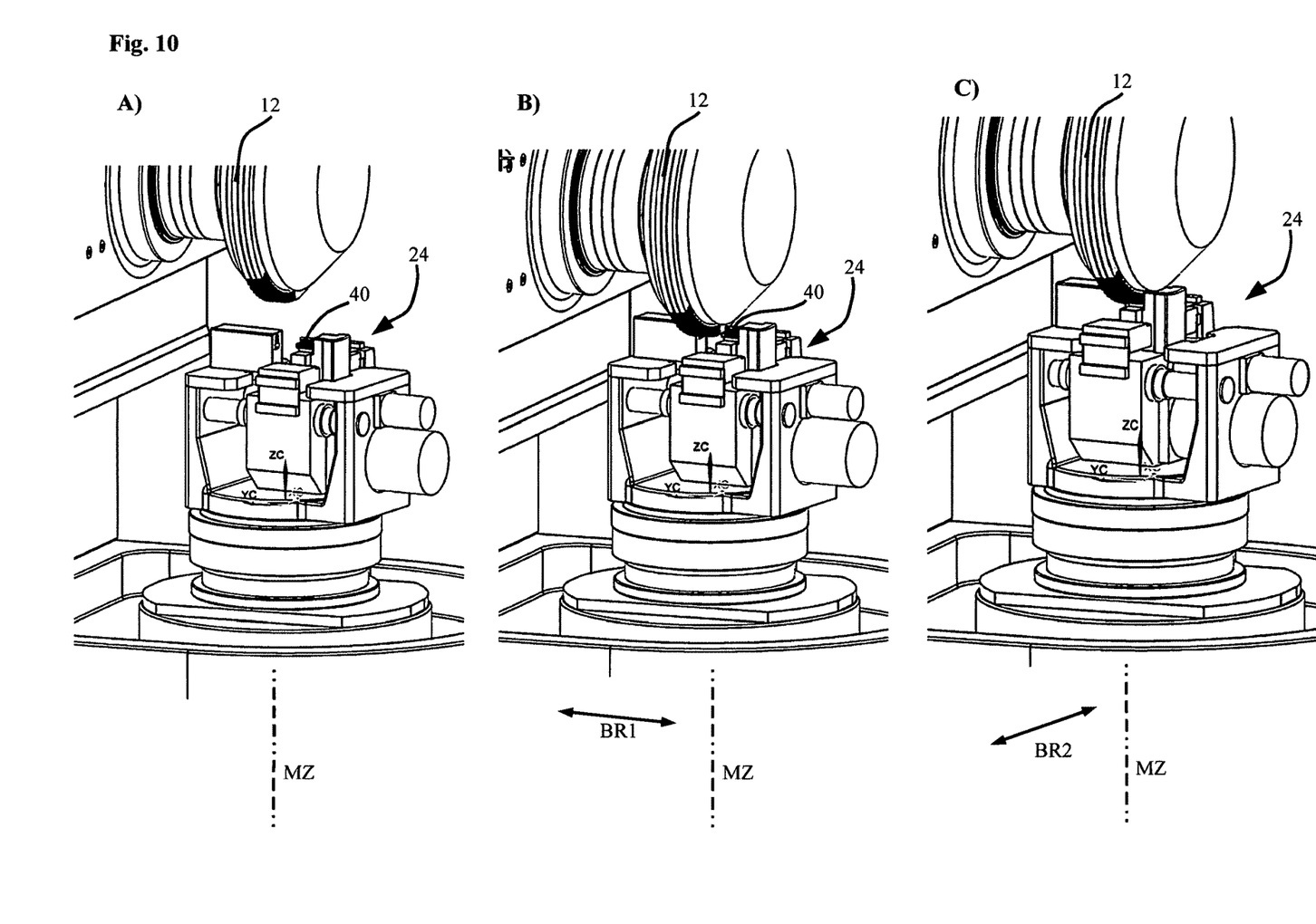
FIG. 10 shows, in figure parts a) to c), the work station of FIG. 1 with a workpiece being machined in different states of the process.

The work station 10 presented here can be used both to produce the final contour of pre-contoured blade root recesses and to produce pre-contoured blade root recesses. For both methods, the work station 10 can be used basically according to the principal steps illustrated in FIG. 10. According to FIG. 10, after providing a blade disk 12 already having pre-contoured blade root recesses or still having a continuous (solid) peripheral edge, the module 24 is oriented by turning about the axis of rotation MZ of the module. Since the electrode 40, 140 used for the electrochemical machining is also turned along with the module 24, the electrode can be aligned appropriately in relation to the blade disk and the (desired or existing) course of the blade root recesses. According to FIG. 10b), there then occurs a downward feeding movement of the blade disk 12 along the feed axis ZA until a desired position has been reached, in which an electrochemical machining by the electrode 40, 140 becomes possible. According to step 10c), there then occurs a movement of the electrode 40, 140 along the first machining direction BR1. In this process, with an electrode 140 of the second type, an electrochemical machining (driving) occurs to produce the pre-contoured blade root recess. An electrode 40 of the first type is introduced only into an already existing pre-contoured blade root recess. In order to produce the final contour, the electrode 40 of the second type is further moved in oscillation along the second machining direction BR2. Once the pre-contour has been produced by the electrode 140 of the second type or the final contour has been produced by the electrode 40 of the first type, the particular electrode is moved out from the preliminary or final contoured blade root recess along the first machining direction. The blade disk 12 is then turned somewhat about the axis of rotation of the workpiece WDA so that the next (adjacent) blade root recess can be produced or machined. In regard to FIG. 10, it should be noted that the arrow pointers denoted as XC, YC or ZC have no relevant significance to the invention presented here; they merely represent directional indications stemming from the CAD system that was used to produce the drawings. Moreover, it should also be pointed out that in FIGS. 10*a* to *c*) the work station 10 with only the electrode 40 of the first type and the corresponding rinsing chambers 64, 66 is shown. It is self-evident that the electrode 40 in this representation could be replaced by the electrode 140 and the rinsing chambers 64, 66 could be replaced by the rinsing chambers 164, 166, as can be seen for example in FIGS. 2 and 8 or 7 and 9.

A work station 10 with an electrode 140 of the second type (see FIGS. 8 and 9) for producing a blade disk with pre-contoured blade root recesses and a work station 10 with an electrode 40 of the first type (see FIGS. 1-7) for producing a blade disk with final contoured blade root recesses can also be combined to form a system for the electrochemical machining of a blade disk. By such a system with at least two work stations, it is possible to produce blade root recesses which are final-contoured in a blade disk, without the need to employ mechanical machining methods for this, in which there is a high risk of geometrical deviations in the final contour.

The invention claimed is:

1. A work station for a electrochemical machining of a rotationally symmetrical workpiece, having a plurality of recesses, comprising:
 a base structure;
 a module which is fastened to the base structure and is configured for the purpose of electrochemically machining the workpiece, wherein the module comprises a module base body that can be rotated relative to the base structure about an axis of rotation of the module;
 a workpiece holder fastened to the base structure, on which the workpiece is fastened or can be fastened, wherein the workpiece holder is movable relative to the base structure along a feed axis parallel to the axis of rotation of the module;
 wherein the module comprises an electrode carrier arrangement, which is coupled to the module base body in such a way that the electrode carrier arrangement is rotated together with the module base body about the axis of rotation of the module,
 wherein the electrode carrier arrangement comprises a carrier frame and an electrode frame, wherein at least one electrode is detachably fastened to the electrode frame,
 wherein the electrode carrier arrangement, including the carrier frame and the electrode frame, is movable in translation relative to the module base body in a first machining direction, which corresponds substantially to a longitudinal direction of the recess, wherein the longitudinal direction runs in parallel with or inclined to its axial direction relative to the workpiece, and wherein the electrode frame is movable, oscillating relative to the carrier frame in a second machining direction, wherein the first machining direction and the second machining direction are aligned at an angle of around 45° to around 90° with respect to each other, and are orthogonal to the axis of rotation of the module.

2. The work station according to claim 1, wherein the electrode frame is hinged to the carrier frame and is connected by at least two solid joints to the carrier frame.

3. The work station according to claim 1 wherein an eccentric drive is provided in the carrier frame and its eccentric shaft is connected to a first end segment of a rocker element, wherein the rocker element is connected by a second end segment to the electrode frame, and wherein the rocker element is connected to the carrier frame in a middle segment located between the first end segment and the second end segment.

4. The work station according to claim 3, wherein the eccentric drive comprises a torsion motor.

5. The work station according to claim 1, wherein the electrode has an outer contour of a first electrode type, which corresponds substantially to a final contour of a profile groove recess to be produced in the workpiece or it has an outer contour of a second electrode type, which corresponds substantially to a pre-contour of a profile groove recess to be produced in the workpiece.

6. The work station according to claim 5, wherein an amplitude of the oscillating movement of the electrode of the first electrode type is regulated or adjusted as a function of the electrochemical ablation of material of the workpiece so the amplitude becomes larger with increasing material ablation.

7. The work station according to claim 6, wherein a spacing between the outer contour of the electrode of the first electrode type and a pre-contour of the recess already present in the workpiece prior to the start of an oscillatory electrochemical machining is less than or equal to around 0.1 mm.

8. The work station according to claim 5, wherein the electrode of the first electrode type is introduced along the first machining direction into a pre-contour of a recess already present in the workpiece, wherein the electrode has a probing tip in a forward region with respect to the direction of introduction.

9. The work station according to claim 8, wherein the work station is configured for determining, by the probing tip, the relative position of the electrode of the first electrode type to a pre-contour of the recess already present in the workpiece before the introduction of the electrode and of adapting it as needed, so that the electrode is introduced with its outer contour substantially centered relative to the pre-contour.

10. The work station according to claim 5, wherein the electrode of the second type is configured for the purpose of producing a pre-contour of a profile groove recess in a still solid segment of the workpiece by electrochemical machining, wherein the electrode of the second type is driven along the first machining direction relative to the workpiece.

11. A system for the electrochemical machining of the rotationally symmetrical workpiece, having the plurality of recesses, including the workstation according to claim 1, comprising at least one first work station having an electrode of the second type configured for the purpose of producing a pre-contour of a profile groove recess in a still solid segment of the workpiece by electrochemical machining, wherein the electrode of the second type is driven along the first machine direction relative to the workpiece and at least one second work station having another electrode, wherein an amplitude of the oscillating movement of the another electrode of a first electrode type is regulated or adjusted as a function of the electrochemical ablation of material of the workpiece so the amplitude becomes larger with increasing material ablation, wherein the system is configured for transporting the workpiece from the first work station to the second work station by an assigned transport mechanism.

12. A method for producing a final contour of a blade root recess in a blade disk of a gas turbine, comprising the steps of:

a) providing a blade disk, having at least one recess fashioned at its peripheral edge, which has a pre-contour provided with an oversize measurement;
b) aligning an electrode as a function of measured values that are detected at the pre-contour,
c) introducing the electrode into the pre-contoured recess along a first machining direction, which corresponds substantially to a longitudinal direction of the recess, wherein the longitudinal direction runs in parallel with or inclined to its axial direction relative to the workpiece;
d) moving the electrode in oscillating manner in the recess along a second machining direction, which is aligned at an angle of around 45° to 90° to the first machining direction,
wherein during the oscillatory movement crosswise to the longitudinal direction of the recess, material is alternately removed from that side of the pre-contour which is situated closer to the oscillating electrode, until the final contour of the recess has been produced,
e) removing the electrode along the first machining direction from the recess with the final contour so produced.

13. The method according to claim 12, wherein steps b) to e) are repeated for each recess with its pre-contour that is present along the periphery of the blade disk.

14. The method according to claim 13, wherein each time after step e), the blade disk, is rotated relative to the electrode until another adjacent recess with pre-contour is situated in a suitable position for performing steps b) to e).

15. The method according to claim 12, wherein step a) includes producing the recesses with their respective pre-contour by an electrochemical machining of solid peripheral segments of the blade disk, wherein the electrochemical machining is carried out with another electrode, and wherein the other electrode is moved along a first machining direction or the first machining direction, which corresponds substantially to a longitudinal direction of the recess being produced, wherein the longitudinal direction runs in parallel with or inclined to the axial direction with respect to the blade disk.

* * * * *